United States Patent Office 2,945,066

Patented July 12, 1960

1

2,945,066

HYDROGENATION OF HYDROCHLORINATED VERBENONE AND PRODUCT OBTAINED THEREBY

Eugene A. Klein, West Los Angeles, Calif., assignor to The Glidden Company, Cleveland, Ohio, a corporation of Ohio No Drawing. Filed Apr. 5, 1957, Ser. No. 651,111

5 Claims. (Cl. 260—587)

This invention relates to an acid reaction of an α-pinene system. It relates more particularly to an acid reaction of verbenone and to the recovery of products obtained therefrom which are useful in the flavor, perfume and pharmaceutical industries. The invention is more particularly concerned with the reaction of verbenone with hydrogen chloride and to the recovery of products obtained by a process to be described more fully hereinafter.

Pinenes, and particularly α-pinene, are very widely distributed in nature. α-Pinene, for example, is a major constituent of turpentine and can be used as a starting material to produce verbenone and other oxygenated compounds, e.g., verbenol, by air oxidation, as is well known. Verbenol can, in turn, be oxidized with chromic acid to produce verbenone. Accordingly, starting materials that can be employed in my invention are well known, and it is not considered necessary to describe their preparation in detail.

The treatment of verbenone with hydrogen chloride has heretofore been disclosed by Blumann and Zeitschel in Ber. 1178–1198 (1913), and by Simonsen in "The Terpenes," vol. 2, 2nd ed., 1949, p. 237. Neither of these references, however, isolated or identified the structures of the reaction products or proposed a method for doing so.

An object of this invention is therefore to provide a method for the treatment of a hydrochlorinated mixture obtained from the addition of hydrogen chloride to verbenone.

Another object of this invention is to provide a method for obtaining useful compounds from a reaction mixture from the addition of hydrogen chloride to verbenone.

A further object of this invention is to obtain stable and isolatable compounds from a reaction mixture obtained from the addition of hydrogen chloride to verbenone.

A still further object of this invention is to provide a novel process for the obtainment of valuable products from a reaction mixture obtained from the addition of hydrogen chloride to verbenone.

Other objects will become apparent from a description of the invention to follow.

In accomplishment of the foregoing objects, my invention relates to a process for obtaining valuable reaction products from a reaction mixture from the addition of hydrogen chloride to verbenone which comprises the steps of hydrogenating said mixture and recovering the resulting reaction products therefrom. By the process of my invention I have succeeded in obtaining valuable mono- and dicyclic oxygenated compounds in good yields. The stable and isolatable compounds obtained by the process of my invention have been identified by spectral and chemical data and are found to be oxygenated derivatives of menthane, fenchane and camphane.

2

In a preferred embodiment of my invention, I have found that I can obtain valuable products from the reaction mixture of verbenone and hydrochloric acid from the addition of hydrogen chloride to verbenone by contacting said mixture with hydrogen in the presence of a hydrogenation catalyst and thereafter recovering the resulting products by distillation. In a specific method for preparing a hydrochlorinated mixture of verbenone with hydrochloric acid, the verbenone is dissolved in acetic acid and then treated, preferably with an excess of hydrochloric acid. The latter is introduced into the solution in gaseous form at room temperature until the solution is saturated or has absorbed an excess of the acid. The temperature of contact of the gaseous hydrogen chloride and the verbenone solution is not critical and can be varied. However, it is preferred to keep the mixture at or below room temperature. The reaction mixture resulting from the introduction of hydrogen chloride is believed to comprise unstable products which have heretofore not been identified or isolated. It should be understood, however, that my invention relates to the treatment of a reaction mixture from the addition of hydrogen chloride to verbenone, however obtained, and the above method is given only to show one such example.

In the preferred embodiment of my invention, I subject the hydrochlorinated mixture to a hydrogenation reaction in the presence of a hydrogenation catalyst. Suitable hydrogenation catalysts are those from the group of the platinum metals, nickel and the like. The catalyst, e.g., palladium, is preferably employed on a suitable carrier; for example, charcoal in amounts of from 1 to 10 percent, and preferably about 5% by weight. Other carriers that can be employed are such as clays, diatomaceous earths, fuller's earth, etc. Although it is not necessary that the hydrogenation catalyst be deposited on a carrier, it is advantageous to do so as an aid to filtering out the catalyst after use. The solution is contacted with the hydrogen by any suitable method or apparatus, for example, by bubbling the gaseous material while stirring the solution mixture. The hydrogenation temperature is kept at approximately room temperature, although higher or lower temperatures can be employed. The reactions of the hydrochlorinated mixture upon contact with hydrogen are principally isomerization and molecular rearrangement and conversion into monocyclic and dicyclic derivatives of menthane, fenchane and camphane. The hydrogen contact with the hydrochlorinated mixture is carried out until the evolution of hydrogen chloride from the mixture has substantially completely subsided. The resulting mixture comprises para- and ortho-menthane derivatives oxygenated in the 3-position, e.g., p-menthones, cis-o-menthone, thymol, chlorinated camphor and fenchone derivatives, i.e., 5-chloro-epicamphor and 6-chloroepiisofenchone, which is believed to be a new compound, and a minor amount of unidentified and non-volatile residue.

The hydrogenated mixture obtained in accordance with the treatment described above can be separated or isolated into fractions containing the desired products by vacuum distillation after removal of solid materials in the solution by filtration. The solution or mixture, prior to distillation, can be worked up, e.g., by concentration of the materials and the like treatment, as is well known.

Although the invention has thus far been described by a series of process steps, the exact reactions occurring during these steps are not completely understood, and no explanation is deemed necessary. However, I have found that the following overall reactions occur in the process steps defined above.

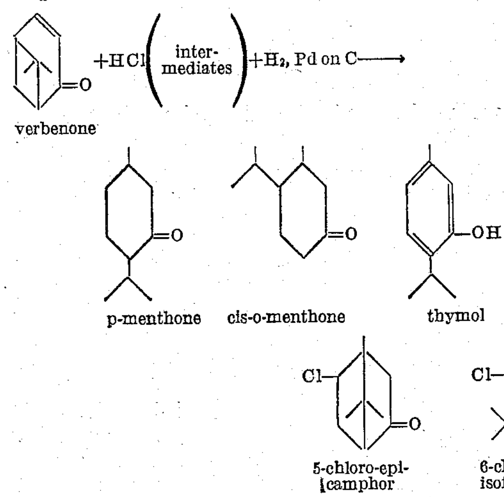

In order that the process and reaction products of this invention may be more fully understood, reference is now made to the following examples. It should be understood that the specific proportions of materials and temperatures employed in the examples, as well as other variables, are not intended as limitations of this invention since these are given by way of illustration of a specific embodiment only.

*Example 1*

A batch of hydrochlorinated reaction mixture of verbenone and hydrochloric acid was prepared by adding 815 grams of verbenone (5.46 moles) to 2 liters of acetic acid to form a solution and then introducing gaseous hydrogen chloride through a fritted glass tube until a total of 535 grams (14.5 moles) of the gas had been absorbed. The temperature of the solution was maintained at from 20 to 27° C. during the introduction of the gaseous hydrogen chloride.

*Example 2*

To a stirred mixture of 3003 grams of the solution of Example 1, there was added 76 grams of 5% palladium on charcoal, and hydrogen was thereafter bubbled through the solution for eight hours, during which time the temperature of the mixture was maintained at about 10° C. The reaction mixture evolved hydrogen chloride during the hydrogenation period. An additional 60 grams of 5% palladium on charcoal in an acetic acid solution was added to the mixture and the addition of hydrogen was continued for about 60 hours at a temperature of about 20 to 30° C., at the end of which time the evolution of hydrogen chloride had practically ceased. (When the mixture was not being hydrogenated, it was kept at a temperature of about −15° C.) The material resulting from the above treatment was then filtered and the filtrate concentrated at about 200 mm. absolute pressure and a pot temperature of about 100° C. until about 2.5 liters of acetic acid had been removed. The mixture was cooled and water was added to a total aqueous phase of about 6.5 liters with the formation of an oil and an aqueous phase. The aqueous phase was extracted with a light naphtha and the light naphtha extract was thereafter combined with the oil layer. A small amount of this mixture was distilled and the oil obtained showed, by infrared spectrophotometric analysis, the presence of menthone, hydroxyl (or phenolic) containing compound(s) and a carbonyl(s) compound having the carbonyl absorption at the same wavelength (5.8μ) as the spectra of camphor and fenchone.

The naphtha solution was steam distilled from a 15% sodium hydroxide solution, but it was found that the residue contained carbonyl and hydroxyl compounds, so the steam distillate was recombined with the residue. The solvent was then distilled from the entire organic phase and the resulting oil was then fractionated through an efficient column packed with stainless steel protruded packing. The distillation was carried out at a pot temperature of 180° C. with a portion of the fractionation being carried out at 10 mm. absolute pressure and thereafter at from 3 to 0.4 mm. A total of 27 fractions were collected, ranging in weight from 7 to 66 grams. Infrared spectra were then made of the fractions, and these indicated the number of compounds present as well as their structural feature. A combination of spectral and chemical data showed the following types of compounds present:

*Methone and isomenthone.*—B.P. 81 to 87° C. at 10 mm. pressure; 24.6% yield. Both of these compounds were identified by comparison of the infrared spectra of the fractions with that of known samples of the compounds. Both compounds were practically racemic as shown by equilibration of a menthone fraction with concentrated sulfuric acid, which after equilibration had an $\alpha_D$+0.5° (10 cm. tube). If the material had been optically active, this value would have been much higher due to the higher rotation of isomenthone which was formed on equilibration. This lack of optical activity is believed to be due to the fact that the initial verbenone ring-opening compound is not 8-chloro-piperitone as might have been expected, since piperitone is not readily racemized by acids. The intermediate was then, most likely, 8-chloro-carvo-menthene-5-one.

*cis-o-Menthone.*—B.P. 93 to 97° C. at 10 mm. pressure; 9.9% yield. This compound was identified by comparison of the infrared spectra of the fraction in this boiling range with that of a known sample. The trans isomer could not be detected.

*6-chloro-epiisofenchone.*—B.P. 60 to 61.5° C. at about 0.4 mm. pressure; $n_D^{25}$ 1.4865, $d_4^{25}$ 1.088, $\alpha_D$ 5° (10 cm. tube); 17.7% yield. This new compound had its major infrared absorption bands at the following wavelengths (μ): 5.81; 6.88, 6.92; 7.17; 7.24; 7.30; 7.35; 7.50; 7.81; 7.93; 8.00; 8.32; 8.54; 8.67; 8.77; 9.08; 9.42; 9.95; 10.51; 10.78; 11.13; 11.41; 12.05; 12.34; 12.54; and 13.34. It gave a positive Beilstein test for chlorine.

The chemical proof of structure was obtained by converting the compound to fenchane by the following reactions: (1) modified sodium reduction of the chloro compound to epiisofenchol; (2) dichromate oxidation of epiisofenchol to epiisofenchone; (3) Wolff-Kischner reduction of epiisofenchone semicarbazone to fenchane. A sample of fenchane, for comparison of infrared spectra, was prepared by the Wolff-Kischner reduction of fenchone semicarbazone and comparison of the spectra identified it as such.

*5-chloro-epicamphor.*—A solid, B.P. 112° C. at 1 mm.; 31.2% yield. This compound, after filtering the fraction containing it and recrystallizing it from light naphtha, had its major infrared absorption bands at the following wavelengths (μ): 5.77; 7.10; 7.23; 7.31; 7.63; 7.74; 7.77; 8.11; 8.29; 8.52; 8.67; 8.77; 8.97; 9.20; 9.34; 9.64; 10.03; 10.15; 10.56; 10.77; 10.94; 11.00; 11.39; 12.00; 12.76; 13.90; and 14.32. The compound gave a positive Beilstein test for chlorine. The chemical proof of the structure was achieved through the same series of reactions and under the same conditions as those described for the fenchyl derivative except that the end product for the camphor derivative was norcamphane, which was also prepared by the Wolff-Kischner reduction of camphor semicarbazone.

*Thymol.*—Present in the fraction boiling at 112° C. at 10 mm.; 7.6% yield. This compound was identified by comparing the infrared spectra of the fraction having the stated boiling point with that of a known sample of thymol.

Thus, a summary of the distillation and spectral data shows that the original palladium reduced oil had the following approximate composition:

| | Percent |
|---|---|
| p-Menthones (menthone and isomenthone) | 24.6 |
| cis-o-Menthone | 9.9 |
| 6-chloro-epiisofenchone | 17.7 |
| 5-chloro-epicamphor | 31.2 |
| Thymol | 7.6 |
| Unidentified | 5.2 |
| Non-volatile residue | 3.8 |
| | 100.0 |

It is interesting to note that the expected reaction of verbenone with hydrochloric acid, that is, the acid opening of the molecule to yield 8-chloropiperitone, which could be dehalogenated to optically active piperitone, did not occur. This was believed to be possible since the prior art teaches that piperitone is not readily racemized with acids. The following experiment was performed:

*Example 3*

A sample of the solution of Example 1 was poured into a saturated sodium carbonate solution with stirring. The mixture, after stirring for a short time, was shown to be composed of less than 15% unreacted verbenone by infrared analysis. It contained conjugated and non-conjugated carbonyl compounds and the oil turned dark and evolved hydrogen chloride on exposure to air.

The oil was recombined with the sodium carbonate solution, stirred for 1½ hours and then refluxed for 3½ hours. The infrared spectrum then showed the presence of piperitenone and other carbonyl compounds. Before the appearance of piperitone, however, there was conjugated carbonyl but no terminal methylene (>C=$CH_2$) absorption. It is thus believed that the precursor of piperitenone was (1,2)(4,8)-p-menthadiene-5-one. The presence of piperitenone in the final oil was established by comparison of infrared spectrum with a known sample. The following are probably the overall reactions in the formation of menthone and isomenthone:

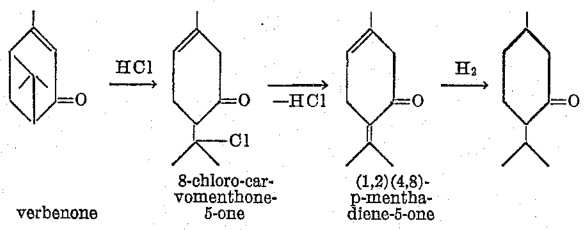

It is also of interest that in these reactions verbenone and concentrated sulfuric acid showed very little tendency to react, as demonstrated by the following example.

*Example 4*

To about 823 grams of verbenone in 1500 cc. of methanol there were added about 150 cc. of concentrated sulfuric acid. After about 4 days standing at room temperature, the oil was unchanged. A sample isolated after 93 days still showed, by infrared spectrum, that about 30% of the verbenone remained unchanged.

The utility of the compounds of this invention is well known. The menthones, for example, are constituents of essential oils oxygenated in the 3-position and are useful in the flavor, perfume and pharmaceutical industries. The menthones additionally can be converted to menthol by reactions and treatments known in the art. Thymol, of course, has been used in the pharmaceutical fields. The uses of camphor (2-camphanone) extend from the plasticizer field to a preservative in pharmaceuticals and cosmetics. In this connection, the 5-chloro-epicamphor compound of this invention can function not only as a plasticizer, but the chlorine group will impart flame retardant properties to the particular plastic material.

From the above description of my invention, it will be understood that it is concerned with a method of obtaining valuable reaction products from a mixture obtained by the addition of hydrogen chloride to verbenone by hydrogenating said mixture in the presence of a hydrogenation catalyst.

Resort may be had to modification falling within the spirit of the invention and scope of the appended claims.

I claim:

1. A process for producing reaction products from a mixture obtained by the addition of hydrogen chloride to verbenone in acetic acid solution which comprises the steps of contacting said mixture with hydrogen in the presence of a hydrogenation catalyst selected from the group consisting of platinum, palladium and nickel and thereafter recovering fractions enriched in 5-chloro-epicamphor and 6-chloro-epiisofenchone.

2. A process for producing reaction products from a mixture obtained by the addition of hydrogen chloride to verbenone in acetic acid solution which comprises contacting said mixture with hydrogen in the presence of a palladium hydrogenation catalyst and thereafter recovering a fraction enriched in thymol.

3. A process for preparing ortho and p-menthones from a mixture obtained by the addition of hydrogen chloride to verbenone in acetic acid solution which comprises contacting said mixture with hydrogen in the presence of a palladium hydrogenation catalyst and thereafter recovering said ortho and p-menthones.

4. A process for preparing 6-chloro-epiisofenchone which comprises hydrogenating a mixture obtained by the addition of hydrogen chloride to verbenone in acetic acid solution, said hydrogenation being carried out in the presence of a palladium hydrogenation catalyst and recovering said 6-chloro-epiisofenchone.

5. 6-chloro-epiisofenchone.

References Cited in the file of this patent

UNITED STATES PATENTS

| | | |
|---|---|---|
| 2,657,164 | Buntin | Oct. 27, 1953 |

OTHER REFERENCES

Bryusova Chem. Abstracts, vol. 35, pgs. 2878–9 (1941).

Simonsen: The Terpenes, vol. II (2nd ed.), pgs. 237, 572, 585–6 (1949).

UNITED STATES PATENT OFFICE

CERTIFICATE OF CORRECTION

Patent No. 2,945,066

July 12, 1960

Eugene A. Klein

It is hereby certified that error appears in the printed specification of the above numbered patent requiring correction and that the said Letters Patent should read as corrected below.

Column 5, line 33, for "piperitone" read -- piperitenone--.

Signed and sealed this 13th day of December 1960.

(SEAL)
Attest:

KARL H. AXLINE
Attesting Officer

ROBERT C. WATSON
Commissioner of Patents